April 26, 1927.
R. J. HARRIS
INSECT TRAP
Filed Feb. 19, 1926
1,626,531
2 Sheets-Sheet 1
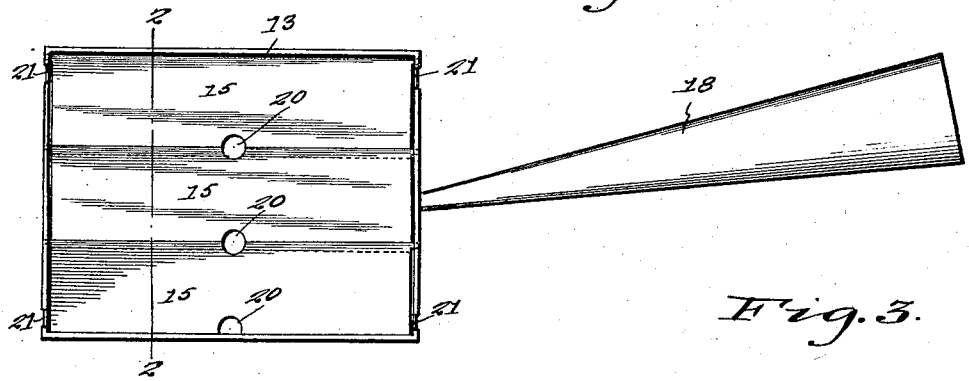
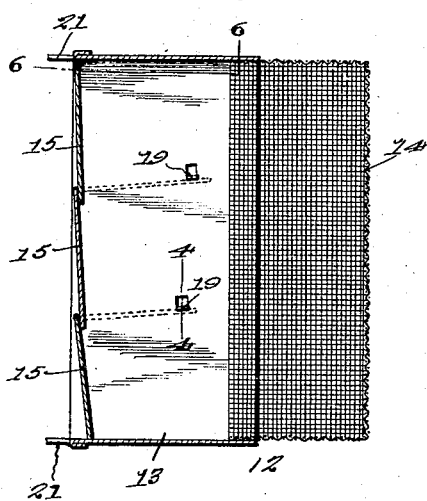
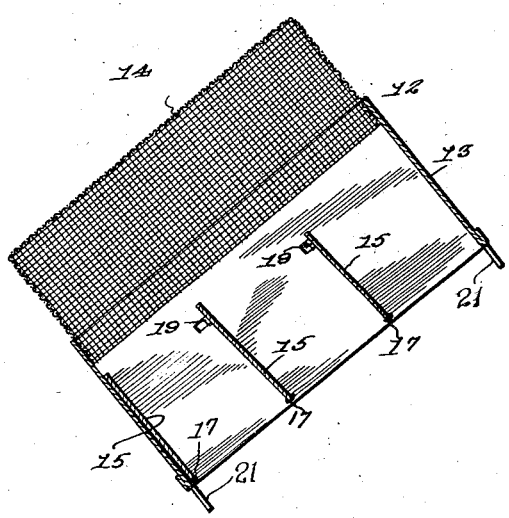
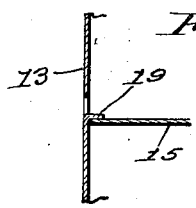
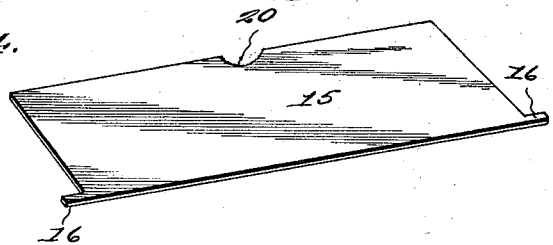
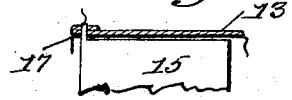
R. J. Harris INVENTOR
WITNESS: BY Victor J. Evans ATTORNEY April 26, 1927.  R. J. HARRIS  1,626,531
INSECT TRAP
Filed Feb. 19, 1926   2 Sheets-Sheet 2

R. J. Harris, INVENTOR

WITNESS:

Patented Apr. 26, 1927.

1,626,531

UNITED STATES PATENT OFFICE.

RAYMOND J. HARRIS, OF HOUSTON, TEXAS.

INSECT TRAP.

Application filed February 19, 1926. Serial No. 89,424.

This invention relates to insect traps and is an improvement upon the inventions disclosed in my co-pending applications, Serial Nos. 83,271 and 83,272, filed January 23, 1926.

Like the inventions described in the applications above referred to, the present invention aims to provide a trap which may be either placed upon a support and baited to attract flies and other insects, or swung through the air to force the insects into the trap.

The present invention further aims to provide a trap with a relatively large entrance opening and to control said opening in such manner that previously caught insects will not be swept out or permitted to escape when the trap is in use.

With the above and other objects in view, the invention further includes the following novel features and details of construction, to be hereinafter more fully described, illustrated in the accompanying drawings and pointed out in the appended claims.

In the drawings:—

Figure 1 is an elevation of a trap constructed in accordance with the invention.

Figure 2 is a section on the line 2—2 of Figure 1, showing the trap closed.

Figure 3 is a similar view showing the trap in position for dumping the insects.

Figure 4 is a fragmentary section taken substantially on the line 4—4 of Figure 2.

Figure 5 is a detail perspective view of one of the pivoted panels or closures.

Figure 6 is a fragmentary section on the line 6—6 of Figure 2.

Figure 7:
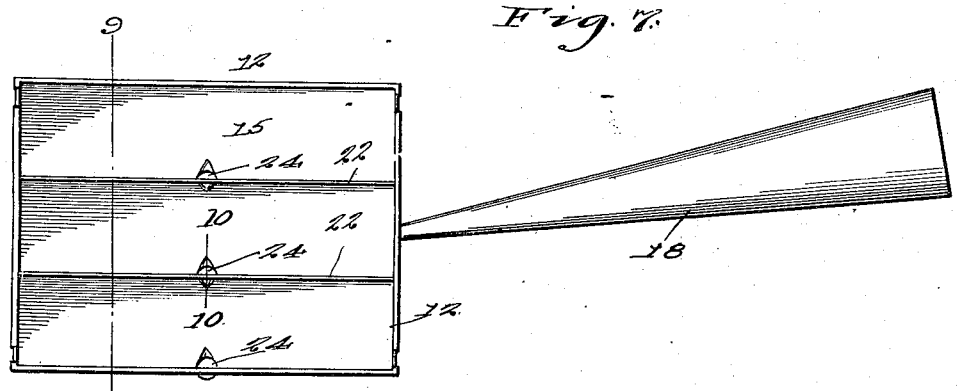
Figure 7 is an elevation showing a slightly different form of the invention.

Referring to the drawings in detail and more especially to the form of the invention illustrated in Figures 1 to 6 inclusive, there is provided a receptacle 12 which is preferably rectangular in shape and formed of an imperforate section 13 and a perforate or foraminous section 14.

One face of the receptacle is open and pivotally mounted along opposite edges of this open face are panels 15. These panels are provided with oppositely extending trunnions 16 which are rotatable in spaced openings 17 provided in the imperforate walls of the receptacle. The width of the panels is such that when the trap is in the position shown in Figures 1 and 2, the panels will act by gravity to close the opening. The adjacent edges of the panels overlap so that the pivoted edge of one panel will form a stop for the free edge of the adjacent panel and limit swinging movement of the panels in one direction. By the use of a number of relatively narrow panels, a large entrance opening may be closed in a manner to prevent previously caught insects from escaping or being swept outward, as might occur in the use of a single large panel.

The receptacle is provided with a handle 18, by means of which it may be swung through the air. When so swung, the panels 15 will move inward to open the receptacle and at the end of the swinging movement, the opening will be closed by the panels 15.

The section 14 of the receptacle is provided for the purpose of admitting heat to kill the captured insects and when it is desired to empty the receptacle, the trap is positioned substantially as shown in Figure 3. In this position, the panels 15 are arranged substantially parallel with one another and are supported upon lugs 19 struck inward from the sides of the receptacle. A substantially unobstructed opening is thus provided so that the trap may be thoroughly and conveniently emptied.

Figure 8:
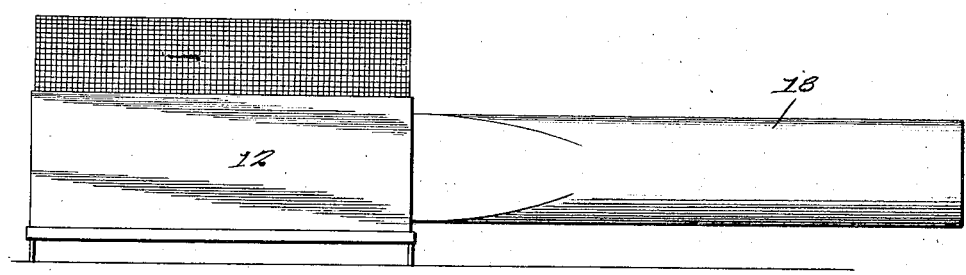
Figure 8 is a view at right angles to Figure 7 illustrating the invention used as a stationary trap.
Figure 9:
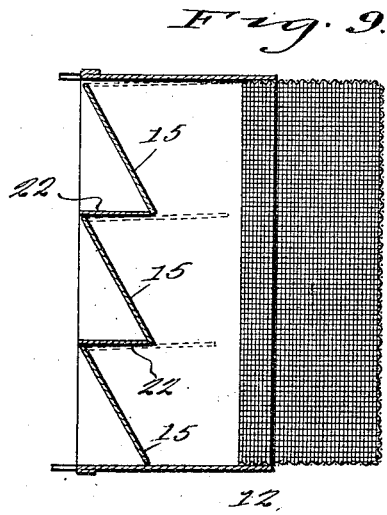
Figure 9 is a section on the line 9—9 of Figure 7.
Figure 10:
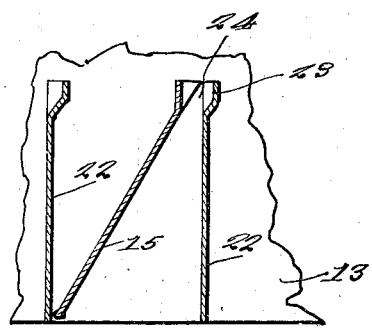
Figure 10 is an enlarged fragmentary section on the line 10—10 of Figure 7.

If desired, the panels may be notched as indicated at 20, so that when the panels are in closed position, these notches will provide restricted openings. The purpose of this is to provide for the use of the invention as a stationary trap. Feet or lugs 21 extend from the edges of the receptacle and serve to support the latter spaced above a suitable support or rest as shown in Figure 8. Flies or other insects may thus pass upward into the trap through the openings 20.

The construction disclosed in Figures 7 to 10 inclusive is substantially the same as that previously described except that the receptacle is provided with spaced parallel bars 22 with which the free edges of the panels 15 engage when the latter are in closed position. The bars 22 also serve to limit inward pivotal movement of the panels as shown by the dotted lines in Figure 9 so as to provide an opening of maximum area for dumping the trap.

The panels illustrated in Figures 7 to 10 of the drawings may be provided with offset portions 23 in their adjacent edges so as to provide restricted entrance openings 24 to admit insects when the device is used as a stationary trap.

The invention is susceptible of various changes in its form, proportions and minor details of construction and the right is herein reserved to make such changes as properly fall within the scope of the appended claims.

Having described the invention what is claimed is:—

1. An insect trap comprising a receptacle having an opening therein, a plurality of movable gravity closed panels for said opening, said panels being arranged with their adjacent edges overlapped when in closed position and a handle for the receptacle.

2. An insect trap comprising a receptacle having an opening therein, a plurality of substantially parallel gravity closed panels for the opening, means to limit inward and outward movement of the panels and a handle for the receptacle.

3. An insect trap comprising a receptacle having an opening at its front end, a plurality of pivotally mounted gravity closed panels arranged adjacent the edge of the opening for closing said opening, means to limit inward and outward movement of the panels and a handle for the receptacle.

4. An insect trap comprising a receptacle having solid walls and foraminous walls and an entrance opening at the outer edge of the solid walls, a plurality of movable gravity closed panels within said opening and a handle for the receptacle.

5. An insect trap comprising a receptacle having an opening therein, a plurality of movable gravity panels arranged to close the opening and said panels being further arranged to provide restricted openings when the panels are in closed position and means to space the receptacle above a support.

6. An insect trap comprising a receptacle having an opening therein, a plurality of pivotally mounted panels arranged to close the opening when the receptacle is held in one position and means to hold the panels substantially parallel with and spaced from one another when the receptacle is held in another position.

In testimony whereof I affix my signature.

RAYMOND J. HARRIS.